(12) United States Patent
Foster et al.

(10) Patent No.: US 11,714,193 B1
(45) Date of Patent: Aug. 1, 2023

(54) METHOD FOR REGISTERING DISTANCE SCAN DATA

(71) Applicant: Direct Current Capital LLC, Wilmington, DE (US)

(72) Inventors: Paul Foster, Mountain View, CA (US); Joel Pazhayampallil, Mountain View, CA (US); Lei Liu, Mountain View, CA (US)

(*) Notice: Subject to any disclaimer, the term of this patent is extended or adjusted under 35 U.S.C. 154(b) by 1171 days.

(21) Appl. No.: 16/136,006

(22) Filed: Sep. 19, 2018

Related U.S. Application Data (60) Provisional application No. 62/560,325, filed on Sep. 19, 2017.

(51) Int. Cl.
   *G01S 17/08* (2006.01)
   *G06T 7/50* (2017.01)
   *G01S 17/89* (2020.01)

(52) U.S. Cl.
   CPC ............ *G01S 17/08* (2013.01); *G01S 17/89* (2013.01); *G06T 7/50* (2017.01)

(58) Field of Classification Search
   CPC ......... G01S 17/08; G01S 17/89; G01S 17/931; G06T 7/50; G06T 7/521; G06T 7/55; G06T 19/20; G01S 7/4808; G01S 7/4972
   See application file for complete search history.

(56) References Cited

U.S. PATENT DOCUMENTS

| | | | |
|---|---|---|---|
| 9,221,396 B1* | 12/2015 | Zhu et al. | G01S 7/40 |
| 9,476,983 B2* | 10/2016 | Zeng | G01S 17/87 |
| 2010/0017060 A1* | 1/2010 | Zhang et al. | G06T 7/73 |
| | | | 701/41 |
| 2017/0031015 A1* | 2/2017 | Mei et al. | G01S 13/865 |
| 2019/0065637 A1* | 2/2019 | Bogdoll et al. | G06N 20/00 |

OTHER PUBLICATIONS

Holý, Branislav, Registration of Lines in 2D LIDAR Scans via Functions of Angles, 2016, ScienceDirect, IFAC-PapersOnLine 49-5 (2016), Pg 109-114 (Year: 2016).*

* cited by examiner

*Primary Examiner* — Yuqing Xiao
*Assistant Examiner* — Benjamin Richard Hebert
(74) *Attorney, Agent, or Firm* — Polsinelli PC (57) ABSTRACT

One variation of a method for registering distance scan data includes: accessing a first distance scan recorded, at a first time, by a first depth sensor defining a first field of view; accessing a second distance scan recorded, at approximately the first time, by a second depth sensor defining a second field of view overlapping a portion of the first field of view; calculating a first set of lines represented by points in a first portion of the first distance scan overlapping a second portion of the second distance scan; calculating a second set of lines represented by points in the second portion of the second distance scan; calculating skew distances between each pair of corresponding lines in the first and second sets of lines; and calculating an alignment transformation that aligns the first distance scan and the second distance scan to minimize skew distances between corresponding pairs of lines.

18 Claims, 3 Drawing Sheets

METHOD FOR REGISTERING DISTANCE SCAN DATA

CROSS-REFERENCE TO RELATED APPLICATIONS

This Application claims priority to U.S. Provisional Pat. Application No. 62/560,325, filed on Sep. 19, 2017, which is incorporated in its entirety by this reference.

TECHNICAL FIELD

This invention relates generally to the field of autonomous vehicles and more specifically to a new and useful method for registering distance scan data in the field of autonomous vehicles.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
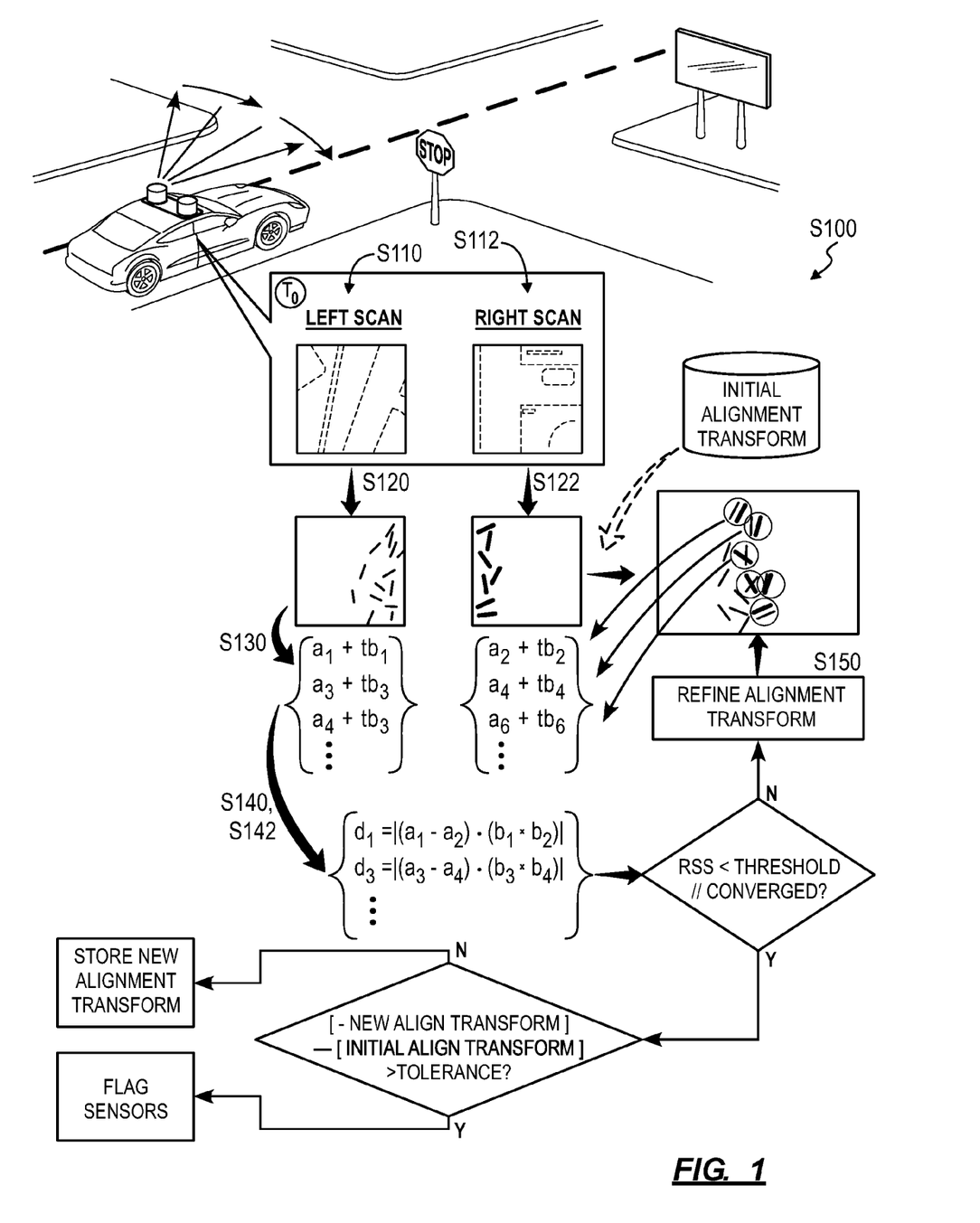
FIG. 1 is a flowchart representation of a method.

As shown in FIG. 1, a method S100 for registering distance scan data includes: accessing a first distance scan recorded by a first depth sensor at a first time in Block S110, the first depth sensor defining a first field of view; accessing a second distance scan recorded by a second depth sensor at approximately the first time in Block S112, the second depth sensor defining a second field of view overlapping a portion of the first field of view; calculating a first set of lines represented by points in a first portion of the first distance scan, in Block S120, overlapping a second portion of the second image; calculating a second set of lines represented by points in the second portion of the second distance scan in Block S122; determining correspondence between lines in the first set of lines and lines in the second set of lines in Block S130; for each pair of corresponding lines in the first set of lines and the second set of lines, calculating a skew distance between the pair of corresponding lines in Block S140 and weighting the skew distance by the perpendicularity of the pair of corresponding lines in Block S142; and an alignment transformation that, when applied to the first distance scan and the second distance scan, minimizes weighted skew distances between corresponding pairs of lines in the first set of lines and the second set of lines in Block S150.

One variation of the method S100 includes, at an autonomous vehicle: accessing a first distance scan recorded by a first depth sensor at a first time in Block S110, the first depth sensor arranged on the autonomous vehicle and defining a first field of view; accessing a second distance scan recorded by a second depth sensor at approximately the first time in Block S112, the second depth sensor offset from the first depth sensor on the autonomous vehicle and defining a second field of view overlapping a portion of the first field of view; calculating a first set of lines represented by points in a first portion of the first distance scan, in Block S120, overlapping a second portion of the second distance scan; calculating a second set of lines represented by points in the second portion of the second distance scan in Block S122; determining correspondence between lines in the first set of lines and lines in the second set of lines in Block S130; for each pair of corresponding lines in the first set of lines and the second set of lines, calculating a skew distance between the pair of corresponding lines in Block S140; and calculating an alignment transformation that, when applied to the first distance scan and the second distance scan, minimizes skew distances, weighted according to corresponding magnitudes, between corresponding pairs of lines in the first set of lines and the second set of lines in Block S150.

Another variation of the method S100 includes, at an autonomous vehicle: accessing a first LIDAR image recorded, at a first time, by a first LIDAR sensor arranged on the autonomous vehicle in Block S110; accessing a LIDAR image recorded, at approximately the first time, by a second LIDAR sensor offset from the first LIDAR sensor on the autonomous vehicle in Block S112; transforming points, in a first region of the first LIDAR image that overlaps a second region of the second LIDAR image, into a first set of lines in Block S120; transforming points, in the second region of the second LIDAR image, into a second set of lines in Block S122; identifying pairs of lines in the first set of lines and the second set of lines that exhibit high correspondence based on spatial proximity and an initial alignment transformation defining relative positions of the first LIDAR sensor and the second LIDAR sensor in Block S130; for each pair of corresponding lines in the first set of lines and the second set of lines, weighting the pair of corresponding lines by the perpendicularity of the pair of corresponding lines in Block S142; and an alignment transformation that, when applied to the first LIDAR image and the second LIDAR image, minimizes skew distances between pairs of corresponding lines, representing points in the first portion of the first LIDAR image and points in the second portion of the second LIDAR image, prioritized according to corresponding weights in Block S150.

2. Applications

Generally, the method S100 can be executed by a computer system to calibrate a rigid body transformation (hereinafter an "alignment transformation") that aligns two distance scans recorded approximately concurrently by two physically-offset sensors. For example, the method S100 can be executed locally by an autonomous vehicle: to collect two distance scans (e.g., three-dimensional point clouds) output substantially simultaneously by two LIDAR sensors integrated into the autonomous vehicle and defining overlapping (e.g., less than 5% overlapping) fields of view; to transform points in a first region of the first distance scan that overlaps the second distance scan into a first set of lines; to transform points in a second region of the second distance scan that overlaps the first distance scan into a second set of lines; to identify pairs of lines in these two sets of lines that exhibit high correspondence, such as based on proximity of lines in these sets of lines when an initial or previous alignment transformation approximating alignment between the first and second LIDAR sensors is applied to the first and second distance scans; to implement a line-based minimization function to calculate a minimum distance (i.e., a "skew distance") between pairs of corresponding lines; to weight each skew distance for pairs of corresponding lines by the perpendicularity between each pair of corresponding lines; and to recalculate an alignment transformation that, when applied to the first and second distance scans, minimizes weighted skew distances between these pairs of corresponding lines.

In this example, the autonomous vehicle can then calculate an error for this solution based on weighted skew distances that this alignment transformation yields when applied to many pairs of corresponding lines extracted from the first and second distance scans and iterate this process until the solution converges on a final alignment transformation that represents a true physical offset between the first LIDAR sensor and the second LIDAR sensor and that aligns points in the first and second LIDAR images. The autonomous vehicle can combine these two distinct distance scans into one composite scan (e.g., a composite LIDAR image) of the field around the autonomous vehicle according to the final alignment transformation and then determine its location and orientation within space based on this composite scan. (The autonomous vehicle can implement the same process to calculate alignment transformations between these and other LIDAR sensors and compile concurrent distance scans from all of these LIDAR sensors into one composite scan of the field around the autonomous vehicle based on these alignment transformations.)

Furthermore, the autonomous vehicle can then apply this final alignment transformation — calculated for the first and second distance scans recorded at approximately the first time — to a next pair of distance scans recorded concurrently by the first and second LIDAR sensors at a later time in order to estimate correspondence between lines in regions of these later distance scans.

The method S100 is described below as executed by an autonomous road vehicle — such as a ground-based passenger, commercial, or fleet vehicle outfitted with multiple LIDAR sensors — in order to virtually align LIDAR images output by these LIDAR sensors. However, the method S100 can be executed by any other vehicle type or computer system to calculate a transform that aligns two or more overlapping distance scans.

2.1 Skew Distance

Thus, an autonomous vehicle can implement line-fit — rather than point-fit — techniques according to the method S100 in order to calibrate an alignment transform that registers (e.g., aligns) distance scans output by two sensors defining fields of view exhibiting some overlap. In particular, point fit techniques — such as Iterative Closest Point ("ICP"), point-to-plane ICP, or generalized ICP methods - may include transforming multiple points in distance scans into planes and then deriving a solution that minimizes distances between corresponding planes in concurrent distance scans. However, adjacent points in such distance scans may be relatively far apart, such as for distance sensors that exhibit lower resolutions or for distance sensors scanning surfaces at relatively large distances, which may yield insufficient information to accurately construct corresponding planes that represent common surfaces in the field from these concurrent distance scans. Such deficiencies in plane-fit techniques may be further exaggerated for distance scans that exhibit little overlap and for fields containing fewer planar surfaces (e.g., in rural settings or along country roads). Therefore, because 1) distance scans of surfaces at significant distances from the distance sensors, 2) lower-resolution distance scans, or 3) distance scans with limited overlap may yield poor plane-fit information: a plane-fit solution such as ICP, point-to-plane, or generalized ICP method may be insufficient to derive a robust solution under any one of these conditions.

However, line-fit information may still be present in such distance scans under the foregoing conditions, such as even if two concurrent distance scans overlap by as little as 5% and/or if these distance scans exhibit less resolution along one axis versus another. In particular, the autonomous vehicle can implement the method S100 to detect corresponding lines from as little as two points from each of two concurrent distance scans and then calculate an alignment transformation that minimizes distances between these corresponding lines in the two concurrent distance scans. Specifically, two non-parallel lines predicted to fall on the same surface (i.e., characterized by high correspondence) will cross each other; the autonomous vehicle executing the method S100 can therefore calculate an alignment transformation that minimizes the shortest distance (i.e., the "skew distance") between these corresponding lines.

However, the skew distance between two corresponding lines may become unstable as these lines approach parallel. (Specifically, a small perturbation of two (nearly-) parallel lines may cause the skew distance between these two lines to change from a relatively small value to a relatively large value.) Therefore, the autonomous vehicle can also implement a weighting factor according to the method S100 in order to reduce the influence of (nearly-) parallel corresponding lines on convergence to a solution (i.e., an alignment transformation) that minimizes skew distance between many corresponding lines in two concurrent distance scans. For example, the autonomous vehicle can calculate the magnitude of the cross product between two corresponding lines — which may approach "0" for parallel lines and may approach "1" for perpendicular lines — and apply this value as a weighting factor to the skew distance between these corresponding lines. The autonomous vehicle can thus execute the method S100: to correct instability of the line-based minimization function by applying a weighting factor; and to converge on a solution that preferentially "pulls" these (more) perpendicular corresponding lines together, since these perpendicular corresponding lines may contain high-quality information defining surfaces represented by these corresponding lines.

Because the autonomous vehicle compiles available points in these distance scans into lines, correspondence between lines in two concurrent distance scans may be intransient as the solution converges, and minimal overlap between these concurrent distance scans may still yield corresponding lines containing sufficient information density to enable the autonomous vehicle to converge on the solution. The autonomous vehicle executing the method S100 can therefore: achieve more efficient user of processing resources by implementing the same pairs of corresponding lines through each iteration of the process to reach convergence in less time; and achieve more efficient use of distance sensors by enabling less overlap between adjacent distance sensors.

2.2 Distance Sensor Changes

Furthermore, by implementing the method S100 to converge on a solution more rapidly, an autonomous vehicle can execute the method S100 regularly throughout operation, such as on a regularly interval of once per hours or continuously while the autonomous vehicle is moving. By comparing final alignment transformations thus calculated over time, the autonomous vehicle can also detect changes in real positions of distance sensors — mounted to the autonomous vehicle — relative to one another and in real-time and then detect an accident, flag the autonomous vehicle, cease operation of the autonomous vehicle altogether, or prompt manual control of the autonomous vehicle, etc. if changes in real positions of distance sensors on the autonomous vehicle exceed a threshold. In particular, an autonomous vehicle executing the method S100 can compare solutions to the line-based minimization function calculated over time to detect and handle changes to the real physical positions of distance sensors arranged on the autonomous vehicle, which may affect localization and autonomous navigation of the autonomous vehicle.

2.3 Autonomous Vehicle Perception

The autonomous vehicle locally executes the method in order to generate or refine an alignment transformation for aligning outputs of two distance sensors (e.g., two LIDAR sensors) arranged on the autonomous vehicle and exhibiting some (e.g., less than 5%) overlap of their fields of view at some distance (e.g., five meters) from the autonomous vehicle. The autonomous vehicle then: implements this alignment transformation to align these (and subsequent) outputs of the distance sensors into a spatially-accurate composite representation (e.g., 3D point clouds) of the field around the autonomous vehicle; and executes perception and localization techniques to determine the context of the field and the geospatial location and orientation of the autonomous vehicle based on this composite representation of the field.

Generally, error in alignment of discrete, concurrent LIDAR images output by two LIDAR sensors may yield spatial errors in a composite scan generated from these discrete LIDAR images, which may yield errors in both perception and localization values derived from this composite scan. In particular, points contained in overlapping regions of discrete, concurrent LIDAR images recorded by two LIDAR sensors may not fall on (e.g., "collapse to") the same set of surfaces when combined in a composite scan based on an erroneous alignment transformation. The autonomous vehicle may therefore incorrectly perceive additional discrete objects in and around this region of the composite scan; the autonomous vehicle may therefore associate a smaller number of points with each of these large number of objects such that the autonomous vehicle has less information about each object, which may reduce the autonomous vehicle's ability to identify types of these objects (e.g., vehicle, pedestrian, road sign) and introduce further perception error. The autonomous vehicle may also determine its geospatial location and orientation by aligning objects detected in the adjacent field to geospatially-referenced objects represented in a localization map; erroneous detection and identification of objects in the composite scan may similarly introduce error in a geospatial position and orientation thus determined by the autonomous vehicle.

Furthermore, LIDAR sensors can be arranged on the autonomous vehicle such that a road surface ahead of the autonomous vehicle falls in the fields of view of these LIDAR sensors; LIDAR images output by these LIDAR sensors may therefore contain points representing roads surfaces. Generally, a road surface may not — in and of itself — represent an obstacle to the autonomous vehicle. However, objects — such as curbs, pedestrians, other vehicles, road signs, etc. — above a road surface may represent obstacles for the autonomous vehicle. The autonomous vehicle can therefore isolate a first set of points representing road surfaces from a second set of points representing other objects — above the road surface — in a composite scan generated by combining multiple discrete, concurrent LIDAR images; the autonomous vehicle can then implement perception, object avoidance, and path planning techniques to detect, identify, and navigate around objects represented by the second set of points.

For example, to isolate (e.g., remove, filter) the first set of points representing a road surface in the composite scan, the autonomous vehicle can: locate a "ground surface" within the composite scan; label each point in the composite scan that intersects the ground surface (or falls within a minimal threshold distance from the ground surface) as representing a road surface; and then mute or remove these labeled points from the composite scan. If the composite scan is constructed from well-aligned LIDAR images, points in the composite scan representing the road surface may collapse onto (or very near) the ground surface. However, if the LIDAR images are misaligned due to error in the alignment transformation, points in the composite scan representing the road surface may fall above or below the ground surface projected into the composite scan such that a "thin" ground surface is insufficient to isolate points representing the road surface; this error may increase at greater distances from the autonomous vehicle. To compensate for this error, the autonomous vehicle may increase the "thickness" of the ground surface (e.g., to a thickness of 500 millimeters) such that a higher proportion of points in the composite scan representing the road surface fall within this volume and can thus be isolated by the autonomous vehicle. However, by increasing the thickness of the ground surface and isolating points inside this thickened ground surface, the autonomous vehicle may also indiscriminately isolate points representing low obstacles — such as curbs, children, small bushes, animals, road debris, and/or large potholes — in addition to points representing the road surface.

To enable the autonomous vehicle to calculate a more accurate alignment transformation, LIDAR sensors can be arranged on the autonomous vehicle such that their fields exhibit greater overlap. However, such arrangement may reduce spatial efficiency of these LIDAR sensors (i.e., require more LIDAR sensors to cover the same aggregate field of view) and may require more time and more processing power both to calibrate and to process their outputs given a greater volume of redundant data contained in LIDAR images output by these LIDAR sensors.

Therefore, the autonomous vehicle can execute the method to calculate a high-accuracy alignment transformation for two LIDAR sensors based on minimally-redundant data collected by these LIDAR sensors (e.g., less than 5% overlap in their fields of view). In particular, the autonomous vehicle can execute Blocks of the method when triggered manually by a local or remote operator, intermittently (e.g., once per day or once per hour of operation), or continuously throughout operation in order to calculate an offset between two LIDAR sensors and to store this offset in the form of an alignment transformation. The autonomous vehicle can then implement this alignment transformation to combine concurrent LIDAR images output by these LIDAR sensors into composite scans that exhibit high spatial accuracy (i.e., low spatial error), thereby enabling the autonomous vehicle to implement a "thin" ground uncertainty region (e.g., a ground surface with a thickness of less than 100 millimeters) to isolate and remove points in the composite scan that represent a road surface while also preserving points in the composite scan that represent low obstacles (e.g., curbs, children, road debris). (The ground uncertainty region can this define a volume in which a road surface around the autonomous vehicle may occur.)

Therefore, the autonomous vehicle can locally execute Blocks of the method to rapidly calculate a high-accuracy alignment transformation that enables the autonomous vehicle to: implement a ground uncertainty region — in the form of a "thin" ground surface — when isolating a road surface in a composite scan generated from the combination of multiple concurrent LIDAR images; and to achieve global consistency of the autonomous vehicle's world view with an efficient distribution of LIDAR sensors defining fields of view with minimal overlap and/or with lower-resolution LIDAR sensors arranged on the autonomous vehicle.

3. Autonomous Vehicle and Scan Data

Block S110 of the method S100 recites accessing a first distance scan recorded by a first depth sensor — defining a first field of view — at a first time; and Block S112 of the method S100 recites accessing a second distance scan recorded by a second depth sensor - defining a second field of view overlapping a portion of the first field of view - at approximately the first time. Generally, in Blocks S110 and S112, an autonomous vehicle accesses distance scans recorded approximately concurrently by two distance sensors defining fields of view exhibiting some (e.g., 30%, 5%) overlap beyond a minimum distance (e.g., two meters).

The autonomous vehicle can include: a suite of sensors configured to collect information about the autonomous vehicle's environment; local memory storing a navigation map defining lane connections and nominal vehicle paths for a road area and a localization map that the autonomous vehicle implements to determine its location and orientation in real space; and a controller that governs actuators within the autonomous vehicle to execute various functions based on the navigation map, the localization map, and outputs of these sensors. In one implementation, the autonomous vehicle includes a set of 360° LIDAR sensors arranged on the autonomous vehicle, such as one LIDAR sensor mounted at each corner of the autonomous vehicle or a set of LIDAR sensors integrated into a roof rack mounted to the roof of the autonomous vehicle. Each LIDAR sensor can output one three-dimensional distance scan — such as in the form of a 3D point cloud representing distances between the LIDAR sensor and external surfaces within the field of view of the LIDAR sensor — per rotation of the LIDAR sensor (i.e., once per scan cycle). For example, each LIDAR sensor can include a stack of pixels (e.g., 16 or 32 pixels arranged in a linear vertical array) mounted on a motorized rotary table; during a scan cycle, the LIDAR sensor can rotate the rotary table and record a distance value from each pixel in the stack at each of many (e.g., 1000 or 4500) points per rotation to produce a distance scan containing a 3D point cloud characterized by a relatively high azimuthal resolution (e.g., 0.3° or 0.08°) and a lower vertical resolution (e.g., 1.7° or 0.8°).

During operation, the LIDAR sensors on the autonomous vehicle can regularly output distance scans, such as at a rate of 10 Hz, and the controller can receive distance scans recorded approximately concurrently by these LIDAR sensors in Blocks S110 and S112 and then execute subsequent Blocks of the method S100 described below to calculate an alignment transformation that aligns these distance scans. The controller can execute this process to calculate an alignment transformation for each set of concurrent distance scans output by these LIDAR sensors. Similarly, the autonomous vehicle can: aggregate a short sequence of consecutive pairs of concurrent distance scans — such as four consecutive, contiguous pairs of distance scans — output by the LIDAR sensors; then implement methods and techniques described below to calculate an alignment transformation that minimizes alignment error between concurrent distance scans in this sequence; and repeat this process for each subsequent sequence of consecutive pairs of concurrent distance scans recorded by the set of LIDAR sensors. Alternatively, the controller can intermittently execute the method S100 to calibrate an alignment transformation - such as once per minute or once per 1000 rotations of (i.e., once per 1000 distance scans output by) the LIDAR sensors - and then apply this same alignment transformation to subsequent sets of concurrent distance scans until the controller recalibrates the alignment transformation at a later time.

Once the autonomous vehicle calibrates the alignment transformation, the autonomous vehicle can: apply this alignment transformation to subsequent concurrent pairs of distance scans recorded by these LIDAR sensors to compile these disparate distance data into one composite image; insert a ground surface (of minimal thickness) into this composite image to isolate (e.g., remove, filter) points representing a road surface in the field near the autonomous vehicle; and then compare remaining points in this composite image to the localization map to determine the geospatial position and orientation of the autonomous vehicle in real space. Based on this geospatial position and orientation of the autonomous vehicle, the controller can: calculate a nominal path between the autonomous vehicle's current location and a specified destination of the autonomous vehicle based on the navigation map; implement a perception model to determine a context of the field around the autonomous vehicle; and elect a next navigational action (e.g., a steering, brake, and accelerator position), such as to remain on or deviate from the nominal path, based on the context of the scene around the autonomous vehicle; and manipulate actuators within the autonomous vehicle accordingly.

4. Points to Lines

Block S120 of the method S100 recites calculating a first set of lines represented by points in a first portion of the first distance scan overlapping a second portion of the second image; and Block S122 of the method S100 recites calculating a second set of lines represented by points in the second portion of the second distance scan. Generally, in Blocks S120 and S122, the autonomous vehicle transforms points in the concurrent distance scans into lines predicted to coincide with surfaces — such as on planar surfaces or surfaces that are linear along at least one axis — in the fields ahead of the LIDAR sensors.

In one implementation, the autonomous vehicle: selects a first row of pixels from the first distance scan (i.e., a set of points recorded by one pixel of the first LIDAR sensor over one full rotation of the LIDAR sensor during a scan period);

select a first point within this first row of pixels; extracts a first set of points around this first point, such as points within the first row exclusively or points within the first row and adjacent rows of points; implements Principal Component Analysis (or "PCA") and Singular Value Decomposition (or "SVD") to filter out noise and to extract principle axes of inertia of this first group of points; and then defines a first line in the first distance scan located at the first pixel and extending in a direction parallel to the main principle component (i.e., the smallest axis of inertia) of the first group of points. In particular, the first scan image may exhibit greater azimuthal resolution than vertical resolution, as described above; points in the first scan image may therefore have nearer neighbors in the same row of points than in the same column of points. The autonomous vehicle can therefore preferentially select a group of neighboring points within one row of the first distance and to extract a line from this group of points such that this line is likely to represent a real, continuous surface in the field of view of the first LIDAR sensor at the time the first distance scan was recorded.

The autonomous vehicle can then repeat this process for a second point offset from the first point along the first row of points to define a second line, etc. The autonomous vehicle can similarly repeat this process to select points in other rows in the first image to generate a first corpus of lines that represent surfaces in the field of view of the first LIDAR sensor in Block S120. The autonomous vehicle can further repeat this process to generate a second corpus of lines that represent surfaces in the field of view of the second LIDAR sensor in Block S122.

In another implementation, the autonomous vehicle can: select a first point in the first row in the first distance scan; select a first cluster of points to a first side of the first point in the first row; select a second cluster of points to a second side of the first point in the first row; calculate a first least squares point for the first cluster; calculate a second least squares point of the second cluster; and calculate a line between the first and second least squares points. The autonomous vehicle can then repeat this process for other points and clusters of points in the first and second distance scans to generate corpuses of lines that represent surfaces in the fields of view of the first and second LIDAR sensors in Blocks S120 and S122.

In the foregoing implementations, the autonomous vehicle can limit selection of points and adjacent groups of points in the first and second distance scans to regions of these distance scans predicted to overlap. For example, the autonomous vehicle can: apply an initial alignment transformation (e.g., a solution from an immediately-preceding calibration routine) to approximately align the first and second distance scans; flag points in each of the first and second distance scans that are near points in the other distance scan; and then selectively derive lines, as described above, from these flagged points.

However, in Block S120, the autonomous vehicle can implement any other methods or techniques to fit local line segments to points in a region of the first distance scan predicted to contain depth information overlapping a second region of the second distance scan, wherein each line segment is defined by a point and a direction (or by two points). Similarly, in Block S122, the autonomous vehicle can implement any other methods or techniques to fit local line segments to points in a region of the second distance scan predicted to contain depth information overlapping a first region of the first distance scan.

5. Filtering + Outlier Rejection

The autonomous vehicle can then implement noise filtering and outlier rejection techniques to discard outliers in the first and second corpuses of lines generated in Blocks S120 and S122. For example, the autonomous vehicle can: calculate a distance between the mean of a cluster of points (in the same and/or adjacent rows of points) neighboring a first line — extracted from the first distance scan — and the center of the first line; and discard the first line if this distance exceeds a threshold value, since the first line may span two distinct offset surfaces in the field of view of the first LIDAR sensors and therefore contain poor or inaccurate surface information.

Alternatively, the autonomous vehicle can implement noise filtering and outlier rejection techniques to discard outlier points in the first and second distance scans prior to extracting lines from these distance scans in Blocks S120 and S122.

6. Line Correspondence

Block S130 of the method S100 recites determining correspondence between lines in the first set of lines and lines in the second set of lines. Generally, in Block S130, the autonomous vehicle identifies sets of corresponding lines, wherein each set of corresponding lines — including one line from each of the first and second distance scans — exhibits a high degree of correspondence and is likely to fall on the same physical surface in the overlapping fields of view of the first and second LIDAR sensors at the time the first and second distance scans were recorded.

In one example, the autonomous vehicle: applies an initial or previous alignment transformation to lines extracted from the first and second distance scans to generate a composite line cloud; computes the Euclidean distance between a center of each line and centers of all other lines in the composite line cloud; and pairs a line from the first distance scan to a line from the second distance scan if the distance between these two lines is less than the distance between these lines and all other lines in the composite line cloud and if this distance is less than a threshold distance. Alternatively, the autonomous vehicle can implement probabilistic measures to identify corresponding lines between the first and second distance scans.

The autonomous vehicle can then output matrices, each defining a set of lines as points and directions with lines in these matrices indexed according to their correspondences. However, the autonomous vehicle can implement any other method or technique to determine correspondences between lines in the first and second distance images and can output these lines and/or their correspondences in any other format in Block S130.

7. Minimization Function and Weighting

The method S100 also includes: for each pair of corresponding lines in the first set of lines and the second set of lines calculating a skew distance between the pair of corresponding lines in Block S140 and weighting the skew distance by the perpendicularity of the pair of corresponding lines in Block S142; and calculating an alignment transformation that aligns the first distance scan and the second distance scan to minimize weighted skew distances between corresponding pairs of lines in Block S150. Generally, the autonomous vehicle: quantifies distances between corresponding lines — which are expected to intersect — under the initial alignment transformation in Block S140; weights these distances as a function of their perceived instability (e.g. weighting by a complementary function to parallelism, such as the cross-product of directions, which is a measure of perpendicularity); and then calculates an alignment transform that, when applied to the matrices or other containers defining these lines, minimizes distances between these corresponding lines (i.e., "pulls" these corresponding lines together).

In particular, two corresponding lines, which are predicted to fall on the same surface, will theoretically intersect; the autonomous vehicle can therefore calculate a minimum offset (i.e., a "skew distance") between two corresponding lines resulting from application of the initial alignment transform in Block S140 and then refine this alignment transform in Block S150 in order to reduce this offset when applied to the matrices or other containers defining these lines. However, the skew distance between two parallel or nearly-parallel lines that fall on approximately the same plane maybe unstable. Therefore, the autonomous vehicle can calculate a weighting factor for each pair of corresponding lines and, implement this weighting factor in Block S150, calculate the alignment transform that preferentially decreases the skew distance between corresponding lines exhibiting a high degree of skew distance stability (e.g., perpendicular lines). For example, in Block S142, the autonomous vehicle can calculate the magnitude of the cross product of two corresponding lines, which may be "o" for parallel lines and "1" for perpendicular lines, and store these values as weighting factors for their associated corresponding lines. Therefore, when this weighting factor is applied to the skew distance of two (nearly-) parallel lines, which may be unstable, the corrected skew distance for these corresponding lines may approach "o." However, the corrected skew distance for two perpendicular corresponding lines may remain substantially unchanged, and the autonomous vehicle can thus converge on a solution that preferentially pulls these perpendicular corresponding lines together.

For example, two corresponding lines $L_1$ and $L_2$ may be given by:

$$L_1 = a_1 + t \bullet b_1 \text{ and}$$

$$L_2 = a_2 + t \bullet b_2,$$

wherein $a_1$ is a first point, $t$ is a free parameter, and $b_1$ is the direction of the first line. The minimum distance (or "skew distance") between these two corresponding lines may be given by:

$$d = |(a_1 - a_2) \bullet (b_1 \times b_2) / |b_1 \times b_2||.$$

However, the weighting factor for these corresponding lines is given by:

$$|b_1 \times b_2|.$$

Therefore, the corrected skew distance for these corresponding lines is given by $$d = |(a_1 - a_2) \bullet (b_1 \times b_2) \bullet |(b_1 \times b_2)| / |b_1 \times b_2||.$$

which simplifies to:

$$d = |(a_1 - a_2) \bullet (b_1 \times b_2)|.$$

In the foregoing example, the autonomous vehicle can perform this calculation for each pair of corresponding lines and then calculate the sum of the squares of these corrected skew distances, which corresponds to error resulting from application of the initial alignment transformation. If this error is less than a threshold error, the autonomous vehicle can confirm that the initial alignment transformation is sufficient to align concurrent distance scans output by the first and second LIDAR sensors. However, if this error is greater than the threshold error, the autonomous vehicle can implement standard nonlinear least squares methods, sum of the squared distance, or other methods to refine parameters of the previous alignment transformation and thereby compute a new alignment transformation that reduces this error (i.e., that reduces corrected skew distances between these corresponding lines). The autonomous vehicle can then: apply this revised alignment transformation to these corresponding lines; calculate new skew distances between these corresponding lines; recalculate total error for this solution; and iterate on this alignment transformation until this total error falls below the threshold error or no longer changes (i.e., until convergence is met).

Finally, once the solution reaches convergence, the autonomous vehicle can store this final alignment transform and subsequently register concurrent distance scans output by the first and second LIDAR sensors according to this final alignment transform. However, if the total error resulting from application of this final alignment transform to these corresponding lines extracted from the first and second distance scans yields skew distances greater than known error of the LIDAR sensors (e.g., ten centimeters), then the autonomous vehicle can determine that the solution has not properly converged and instead discard the alignment transformation.

However, the autonomous vehicle can implement any other methods or techniques in Blocks S140, S142, and S150 to calibrate an alignment transformation based on weighted skew distances between corresponding lines extracted from two concurrent distance scans output by the first and second LIDAR sensors.

8. Sequence of Concurrent Distance Scan Pairs

Figure 2:
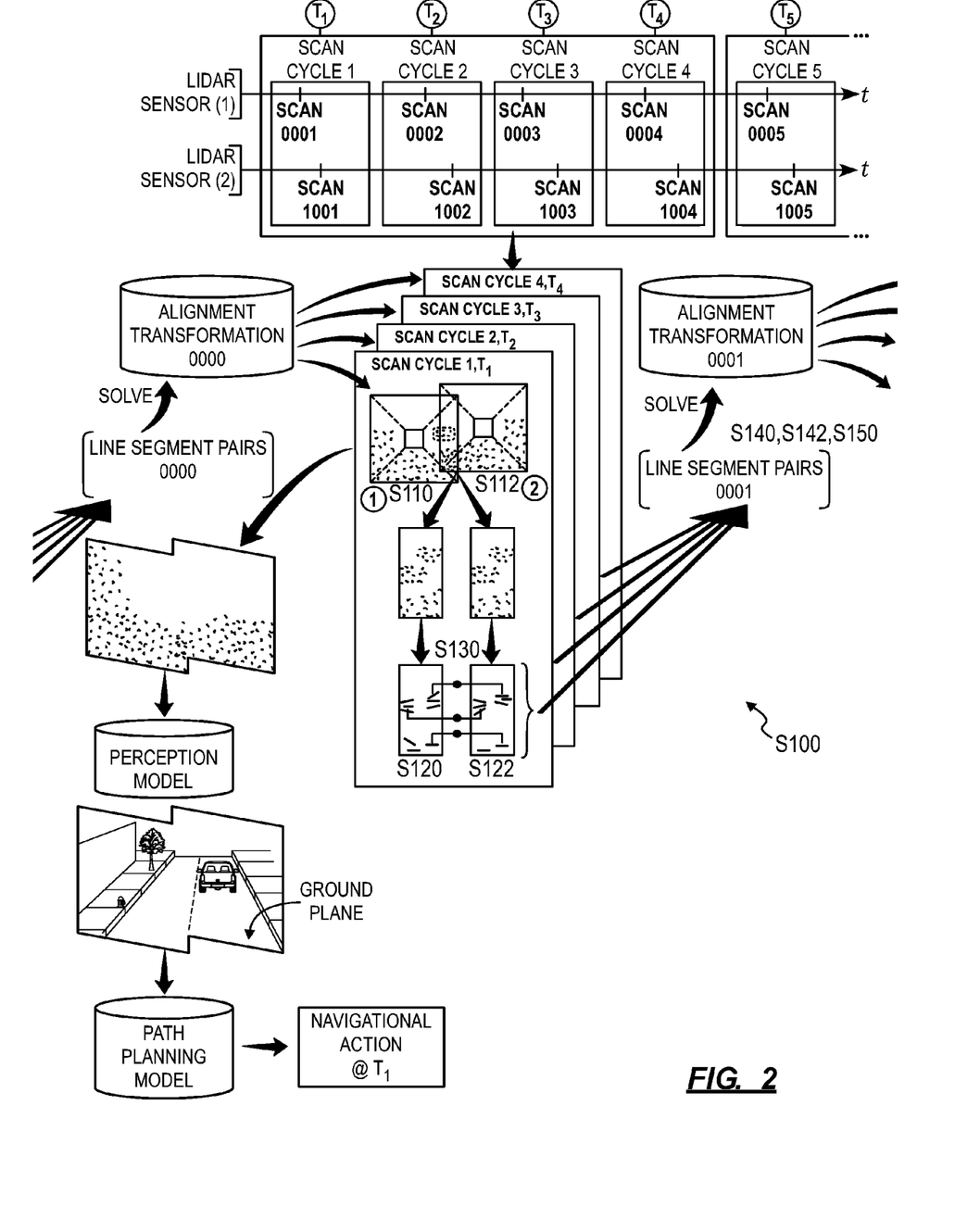
FIG. 2 is a flowchart representation of one variation of the method.

In one variation shown in FIG. 2, the autonomous vehicle: aggregates a sequence of consecutive distance scan pairs output by the LIDAR sensor over a period of time (e.g., less than one second); implements the foregoing methods and techniques to derive correspondences between points in overlapping regions of concurrent distance scan pairs in this sequence; and then solves for an alignment transformation that minimizes skew distances between corresponding points across these distance scan pairs.

For example, during a first scan cycle at the first and second LIDAR sensors (e.g., over a period of approximately 100 milliseconds), the autonomous vehicle can: access a first distance scan recorded by a first LIDAR sensor at a first time; access a second distance scan recorded by a second LIDAR sensor at approximately the first time; calculate a first set of lines represented by points in a first portion of the first distance scan overlapping a second portion of the second distance scan; calculate a second set of lines represented by points in the second portion of the second distance scan; and determine correspondence between lines in the first set of lines and lines in the second set of lines. During a second scan period immediately succeeding the first scan cycle, the autonomous vehicle can: access a third distance scan recorded by the first LIDAR sensor at a second time succeeding the first time; access a fourth distance scan recorded by the second LIDAR sensor at approximately the second time; calculate a third set of lines represented by points in a third portion of the third distance scan overlapping a fourth portion of the fourth distance scan; calculate a fourth set of lines represented by points in the fourth portion of the fourth distance scan; and determine correspondence between lines in the third set of lines and lines in the fourth set of lines. The autonomous vehicle can implement this process during a third scan cycle and a fourth scan cycle, etc. immediately succeeding the second scan cycle to amass sets of line correspondence across a sequence of consecutive scan cycles (e.g., spanning a duration of 400 milliseconds). For each pair of corresponding lines derived from distance scan pairs recorded during this sequence of consecutive scan cycles, the autonomous vehicle can also calculate a skew distance between the pair of corresponding lines and weight this skew distance by the perpendicularity of the pair of corresponding lines. The autonomous vehicle can then calculate one alignment transformation that minimizes weighted skew distances between corresponding pairs of lines in distance scan pairs recorded during this sequence of consecutive scan cycles.

Therefore, in the foregoing example, the autonomous vehicle can access concurrent distance scans recorded by two LIDAR sensors on the autonomous vehicle, extract overlapping "slivers" from these concurrent distance scans (e.g., based on a previous alignment transformation calculated for these LIDAR sensors by the autonomous vehicle), derive lines from points in these slivers, and derive line-to-line correspondence between these lines (e.g., by implementing a k-d tree or a point-to-point comparison between the two distance scans). The autonomous vehicle can repeat this process for each subsequent scan cycle over a target number of scan cycles (e.g., a total of four scan cycles) or over a target duration of time (e.g., one second). The autonomous vehicle can then implement least squares techniques to solve for an alignment transformation (e.g., in the form of a matrix) that minimizes skew distances between these pairs of corresponding lines derived from each pair of concurrent distance scans across this sequence of scan cycles.

Therefore, by solving for the alignment transformation based on pairs of corresponding lines derived from pairs of concurrent distance scans recorded over multiple scan cycles, the autonomous vehicle can further reject noise and further reduce error in the alignment transformation.

9. Additional LIDAR Sensors

Figure 3:
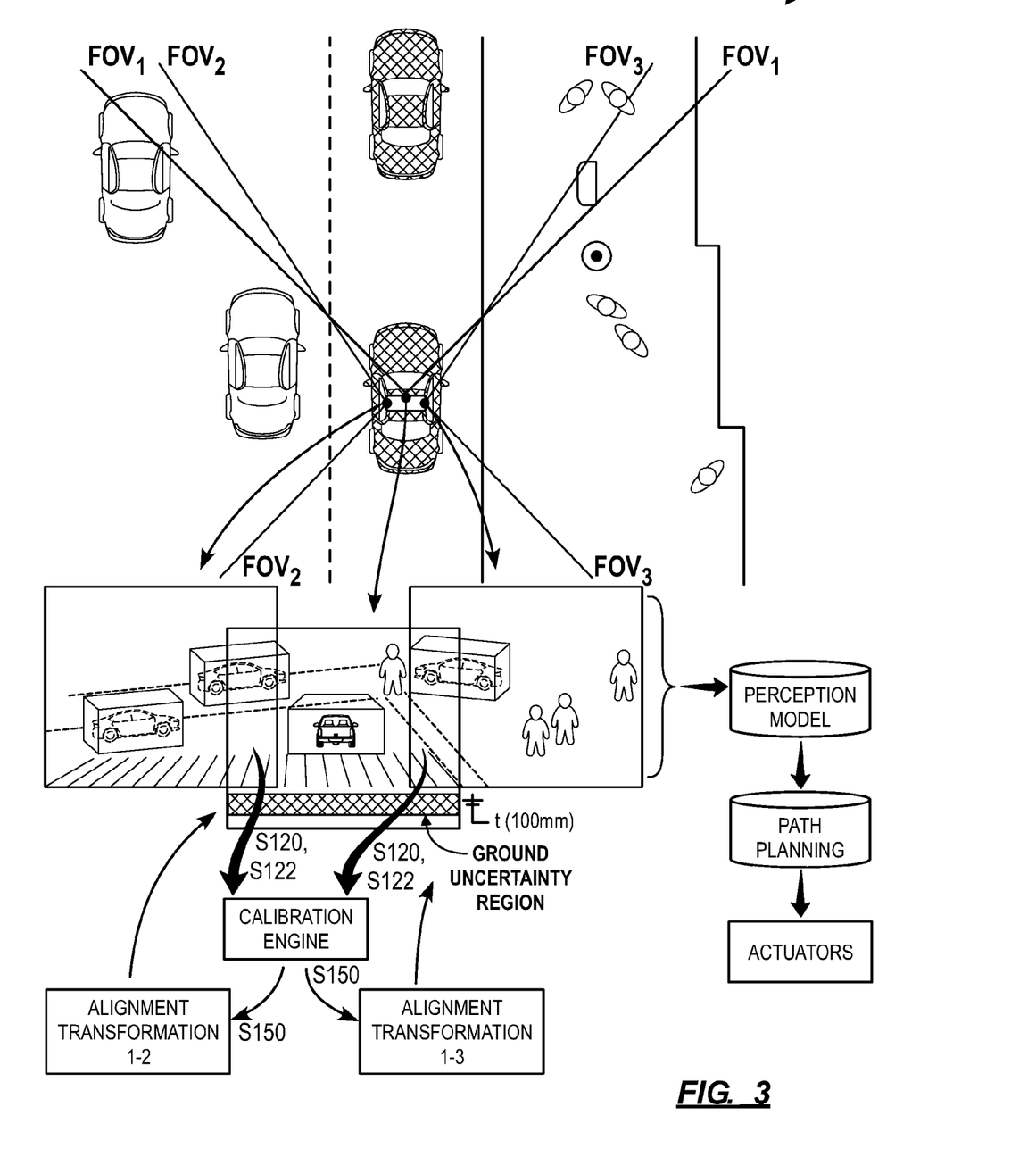
FIG. 3 is a flowchart representation of one variation of the method.

Furthermore, the autonomous vehicle can execute this process for all LIDAR sensors arranged on the autonomous vehicle and defining overlapping fields of view in order to calibrate a set of alignment transformations, as shown in FIG. 3. The autonomous vehicle can then register concurrent distance scans output by all of these LIDAR sensors at a subsequent time by applying these alignment transformations to their corresponding distance scan pairs in order to compile these disparate distance scans into a single composite 3D point cloud that represents surfaces around the autonomous vehicle at this time.

For example, during a current scan cycle, the autonomous vehicle can: access a first distance scan recorded by a first LIDAR sensor at a first time; access a second distance scan recorded by a second LIDAR sensor at approximately the first time; calculate a first set of lines represented by points in a first portion of the first distance scan overlapping a second portion of the second distance scan; calculate a second set of lines represented by points in the second portion of the second distance scan; determine correspondence between lines in the first set of lines and lines in the second set of lines; calculate a weight of a pair of corresponding lines by the perpendicularity of the pair of corresponding lines for each pair of corresponding lines in the first and second sets of lines; and solve for a first alignment transformation that minimizes skew distances between pairs of corresponding lines in the first and second sets of lines, prioritized (or weighted) by their corresponding weights. During the same scan cycle, the autonomous vehicle can similarly access a third distance scan recorded, at approximately the first time, by a third LIDAR sensor offset from the first LIDAR sensor opposite the second LIDAR sensor on the autonomous vehicle, wherein a third field of view of the third LIDAR sensor partially overlaps the first field of view of the first LIDAR sensor but is distinct from the second field of view of the second LIDAR sensor. The autonomous vehicle can then: calculate a third set of lines represented by points in a third portion of the first distance scan overlapping a fourth portion of the third distance scan in Block S120; calculate a fourth set of lines represented by points in the fourth portion of the third distance scan in Block S122; determine correspondence between lines in the third set of lines and lines in the fourth set of lines in Block S130; and calculate a weight of a pair of corresponding lines by the perpendicularity of the pair of corresponding lines for each pair of corresponding lines in the third and fourth sets of lines in Block S142. The autonomous vehicle can then calculate a second alignment transformation that, when applied to the first distance scan and the third distance scan, minimizes weighted skew distances between corresponding pairs of lines in the third set of lines and the fourth set of lines in Block S150. By locating the first LIDAR image relative to the second LIDAR image based on the alignment transformation and locating the first LIDAR image relative to the third LIDAR image based on the second alignment transformation, the autonomous vehicle can then construct one composite scan that represents real objects and surfaces in the fields of view of the first, second, and third LIDAR sensors.

The autonomous vehicle can implement similar methods and techniques to calculate alignment transformations for other LIDAR sensors defining overlapping fields of view and to implement these alignment transformations to combine concurrent distance scans from all of these LIDAR sensors into one composite scan for the current scan cycle.

10. Triggers

In one variation, the autonomous vehicle can execute Blocks of the method S100 intermittently to calibrate an alignment transform that registers distance scans output by two offset LIDAR sensors arranged on the autonomous vehicle. For example, the autonomous vehicle can execute the method S100 to calibrate the alignment transform when the autonomous vehicle is parked, such as in a known garage at a home location or in a parking lot, or when the autonomous vehicle is stopped, such as at a traffic light or stop sign. In another example, the autonomous vehicle can execute the method S100 to calibrate the alignment transform when a large acceleration is detected at the autonomous vehicle, such as when an impact (e.g., an accident) is detected at the autonomous vehicle or when the autonomous vehicle passes over a large pothole, as indicated by an output of an accelerometer in the autonomous vehicle exceeding a threshold acceleration value. In yet another example, the autonomous vehicle executes the method S100 in response to receipt of a calibration trigger issued by a human, such as a remote human operator or human operator occupying the autonomous vehicle.

The autonomous vehicle can also execute the method S100 to calibrate the alignment transform when the autonomous vehicle is moving. For example, the autonomous vehicle can execute the method S100 at a rate proportional to a speed of the autonomous vehicle or based on a distance traversed by the autonomous vehicle (e.g., once per ten meters traversed by the autonomous vehicle). In another example, the autonomous vehicle can execute the method in response to cumulative operation of the autonomous vehicle for more than a threshold duration of time (e.g., one hour) since calculation of a previous alignment transformation. In yet another example, the autonomous vehicle can execute the method S100 on a regular interval, such as once per ten-second interval (e.g., once per 100 distance scans output by the LIDAR sensors operating a rate of 10 Hz).

Alternatively, the autonomous vehicle can execute the method continuously. For example, the autonomous vehicle can: aggregate concurrent distance scans recorded by the LIDAR sensors over a first sequence of four consecutive scan cycles; derive a first alignment transformation based on this first set of concurrent distance scans according to the method; implement this first alignment transformation to spatially-align the next set of concurrent distance scans recorded by the LIDAR sensors over a second, subsequent sequence of four consecutive scan cycles; derive a second alignment transformation based on this second set of concurrent distance scans; implement this second alignment transformation to spatially-align the next set of concurrent distance scans recorded by the LIDAR sensors over a third, subsequent sequence of four consecutive scan cycles; etc. throughout operation.

However, the autonomous vehicle can execute the method S100 responsive to any other time, distance, location, acceleration, and/or other triggers to recalibrate the alignment transformation.

11. Error Detection

In one variation shown in FIG. 1, the autonomous vehicle detects physical perturbation of LIDAR sensors arranged on the autonomous vehicle based on difference between final alignment transformations calculated over time. Generally, each calibration routine executed by the autonomous vehicle yields a final alignment transformation that registers two concurrent distance scans output by two LIDAR sensors with overlapping fields of view, as described above. Each alignment transformation therefore represents a real linear and rotational offset between these two LIDAR sensors, and differences between alignment transformations thus calculated over time may indicate that these LIDAR sensors have moved relative to one another.

In this variation, final alignment transformations calculated by the autonomous vehicle in Block S150 may exhibit minimal differences if the pair of LIDAR sensors represented by these final alignment transformations have not moved relative to one another. However, if the autonomous vehicle is involved in an accident, if one of these LIDAR sensors loosens on its mount, or if the autonomous vehicle contacts a pothole while at speed, or if an uneven road surface traversed by the autonomous vehicle is causing the autonomous vehicle to vibrate, the relative position of these two LIDAR sensors may change, thereby resulting in a difference between final alignment transformations calculated before and after this event. In some instances, the magnitude of change in relative position of these two LIDAR sensors — as determined from differences between two (consecutive) final alignment transformations — may fall within a preset tolerance and may therefore not substantively affect the ability of the autonomous vehicle to determine its location and orientation in real space from data output by these LIDAR sensors, such as a change in relative position of these two LIDAR sensors due to local vibrations occurring while navigating along an uneven road surface. The autonomous vehicle can therefore continue its operation in light of such minimal change in the relative position of these two LIDAR sensors. However, if the change in the relative position of these two LIDAR sensors exceeds this tolerance, the autonomous vehicle can determine that outputs of these LIDAR sensors are no longer reliable and then disable autonomous operation of the autonomous vehicle and/or prompt a human to assume manual control of the autonomous vehicle accordingly.

In one example, the autonomous vehicle is outfitted with a single sensor module (e.g., a roof rack) containing a left LIDAR sensor, a center LIDAR sensor, and a right LIDAR sensor, wherein the fields of view of the left and center LIDAR sensors overlap and the fields of view of the center and right LIDAR sensors overlap at some minimal distance (e.g., 5% at three meters) from the sensor module but the fields of view of the left and right LIDAR sensors overlap at a much greater distance (e.g., 2% at 50 meters) from the sensor module. The autonomous vehicle can thus implement Blocks of the method S100 to calculate a left alignment transformation between left and center LIDAR sensors and to calculate a right alignment transformation between center and right LIDAR sensors. Thus, if the current left alignment transformation differs substantively from a preceding left alignment transformation, the autonomous vehicle can determine that the relative position of the left and center LIDAR sensors has changed. If the concurrent right alignment transformation has not substantively changed from the preceding right alignment transformation, the autonomous vehicle can determine that the relative position of the center and right LIDAR sensors has not substantively changed and thus specifically determine that the left LIDAR sensor has shifted on the sensor module. The autonomous vehicle can then flag the left LIDAR sensor and either queue the autonomous vehicle for maintenance to correct the position of the left LIDAR sensor or disable autonomous operation of the autonomous vehicle altogether.

In another example, the autonomous vehicle is outfitted with: a front-mounted sensor module (e.g., a front roof rack) containing a front-left LIDAR sensor and a front-right LIDAR sensor; and a rear-mounted sensor module (e.g., a rear roof rack) containing a rear-left LIDAR sensor and a rear-right LIDAR sensor. In this example, the fields of view of the front-left and front-right LIDAR sensors overlap, the fields of view of the rear-left and rear-right LIDAR sensors overlap, the fields of view of the front-left and rear-left LIDAR sensors overlap, and the fields of view of the front-right and rear-right LIDAR sensors overlap at some minimal distance (e.g., 5% at three meters) from the sensor modules. During each calibration routine, the autonomous vehicle can execute the method S100 to generate: a front alignment transformation for the front-left and front-right LIDAR sensors; a rear alignment transformation for the rear-left and rear-right LIDAR sensors; a left alignment transformation for the front-left and rear-left LIDAR sensors; and a right alignment transformation for the front-right and rear-right LIDAR sensors from distance images output by these LIDAR sensors, as described above. Thus, if these alignment transformations do not substantively change over time, then the autonomous vehicle can determine that the relative position of the LIDAR sensors on each sensor module and the relative position of the sensor modules have not substantively changed. However, if the front and left alignment transformations have substantively changed while the rear and right alignment transformations have not, the autonomous vehicle can determine that the front-left LIDAR sensor has shifted on the front sensor module. Similarly, if the left and right alignment transformations have substantively changed while the front and rear alignment transformations have not, the autonomous vehicle can determine that the relative position of the front and rear sensor modules has changed (e.g., the front roof rack has moved on the autonomous vehicle relative to the rear roof rack). The autonomous vehicle can then selectively flag the autonomous vehicle for repair or disable autonomous operation of the autonomous vehicle altogether accordingly.

In yet another example, the autonomous vehicle can characterize a difference between two alignment transformations calculated for one pair of LIDAR sensors over time, such as: the current and preceding consecutive alignment transformations calculated from two consecutive sequences of distance scan pairs (e.g., the current sequence of four distance scan pairs and the immediately-preceding sequence of four distance scan pairs); a current and preceding alignment transformation bounding a target duration of time (e.g., one hour); or a baseline alignment transformation assigned to the autonomous vehicle when first deployed and a current alignment transformation calculated by the autonomous vehicle. Then, in response to the difference between two alignment transformations exceeding a threshold difference, the autonomous vehicle can cease autonomous operation. For example, in response to the difference exceeding a threshold difference, the autonomous vehicle can: serving a prompt for manual control of the autonomous vehicle to an occupant inside the autonomous vehicle or to a remote operator; and transition from autonomous operation to manual operation responsive to confirmation from the occupant or remote operator.

The autonomous vehicle can therefore regularly execute the method S100 to recalibrate alignment transformations to register concurrent distance scans output by LIDAR sensors defining overlapping fields of view and then implement these alignment transformations to compile these concurrent distance scans into accurate representations of surfaces around the autonomous vehicle at times that these distances were recorded. By then comparing these alignment transformations over time, the autonomous vehicle can also detect changes to real relative positions of these LIDAR sensors on the autonomous vehicle, which may affect the autonomous vehicle's ability to accurately and repeatably determine its location in real space, contextualize its environment, and execute appropriate actions while navigating a path autonomously.

12. Ground Uncertainty Region + Perception + Autonomous Navigation

As described above, once the autonomous vehicle calculates an alignment transformation for two LIDAR sensors based on distance scans output by these LIDAR sensors during a current or recent scan cycle, the autonomous vehicle can locate these distance scans (or subsequent distance scans) based on this alignment transformation to generate a composite scan. The autonomous vehicle can then: project a ground uncertainty region into the composite scan; isolate a first subset of points in the composite scan located above the ground uncertainty region; interpret a first set of objects in the field proximal the autonomous vehicle based on this first subset of points; elect a navigational action based on this first set of objects in the field; and execute this navigational action in (near) real-time (e.g., within 100 milliseconds of recording these distance scans).

In one implementation, the autonomous vehicle stores a local copy of a localization map that defines a georeferenced surface, profile, plane, or manifold representing road surfaces within a geographic region. In this implementation, the autonomous vehicle can pass a constellation of features detected in a previous distance scan recorded during a preceding scan cycle in the localization map to calculate its last geospatial location and orientation and then implement dead reckoning techniques to transform this last geospatial location and orientation into a current geospatial location and orientation. Based on its current geospatial location and orientation, the autonomous vehicle then: queries the localization map for a profile of a road surface in the field proximal the autonomous vehicle, such as relative to the autonomous vehicle; and projects this road surface profile into the composite scan.

The autonomous vehicle can also thicken this road surface profile, such as by a vertical distance of less than 120 millimeters, to define the ground uncertainty region, as shown in FIG. 3. For example, the autonomous vehicle can thicken the road surface prolife by a vertical distance of 100 millimeters to encompass noise or a typical error of known magnitude (e.g., +/- 40 millimeters) - in a composite image generated based on an alignment transformation generated according to the method S100 - at a target perception distance (e.g., 200 meters) from the autonomous vehicle. By thus thickening the road surface profile by a limited vertical distance based on predicted noise or error produced by the alignment transformation to define a ground uncertainty region, the autonomous vehicle can both 1) isolate a first set of points falling outside (i.e., above) this ground uncertainty region and which are highly likely to represent obstacles in the field around the autonomous vehicle and 2) isolate (e.g., filter, remove) a second set of points like highly likely to represent a road surface around the autonomous vehicle with high selectivity between the first and second sets of point. The autonomous vehicle can thus preserve a representation of substantially all obstacles - even low obstacles, such as curbs, road debris, animals, and small children in the field around the autonomous vehicle - in the composite scan even at significant distances from the autonomous vehicle (e.g., up to 200 meters from the autonomous vehicle).

The autonomous vehicle can then implement perception techniques to detect and identify objects in this filtered composite image, implement path planning and object avoidance techniques to define a next navigational action (e.g., in the form of a steering, brake, and accelerator position)

based on perception of objects in the filtered composite image, and then execute autonomous navigation techniques to autonomously execute this next navigational action. The autonomous vehicle can also compare a constellation of features or objects derived from this filtered composite image to the localization map to verify its current geospatial location and orientation.

In the foregoing implementation, the autonomous vehicle can additionally or alternatively calculate a profile of a road surface in the field around the autonomous vehicle directly from the composite image. For example, the autonomous vehicle can: project a boundary of the road surface from the localization map into the composite scan; identify a set of points in the composite scan that fall inside this boundary; select a subset of lowest points in this set; calculate a 3D profile that intersects this subset of lowest points; and thicken this 3D profile, such as by 100 millimeters as described, to define the ground uncertainty region. The autonomous vehicle can then implement the foregoing methods and techniques to perceive and respond to objects represented by points in the composite scan location above this ground uncertainty region.

However, the autonomous vehicle can implement any other method or technique to process a composite scan and to autonomously execute navigational actions accordingly.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a human annotator computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

A person skilled in the art will recognize that the previously detailed techniques maybe combined with standard techniques such as Simultaneous Localization and Mapping (SLAM), Bundle Adjustment, Ego motion compensation, to relax the data acquisition requirements of the above techniques without departing from the essential scope of the invention. For example, such techniques may enable a single sensor to fulfill the role of multiple sensors by combining scans recorded at different times. In another example, pairwise (or "one-to-one") techniques described above may be applied to many-to-many or one-to-many procedures.

A person skilled in the art will recognize that the previously detailed techniques may be applied to any other three-dimensional scanning technique, such as in addition to or instead of distance-based scanning, since various scanning techniques may be interconvertible via common mathematical procedures.

As a person skilled in the art will recognize from the previous detailed description and from the figures and claims, modifications and changes can be made to the embodiments of the invention without departing from the scope of this invention as defined in the following claims.

We claim:

1. One or more tangible non-transitory computer-readable storage media storing computer-executable instructions for performing a computer process on a computing system, the computer process comprising:
   accessing a first distance scan recorded by a first depth sensor during a time period, the first depth sensor defining a first field of view of a scene;
   accessing a second distance scan recorded by a second depth sensor during the time period, the second depth sensor defining a second field of view overlapping at least a portion of the first field of view of the scene;
   determining a first point set corresponding to a first portion of the first distance scan;
   determining a second point set corresponding to a second portion of the second distance scan, the first portion of the first distance scan overlapping the second portion of the second distance scan;
   determining a correspondence between the first set of points and the second set of points, the correspondence including a pair of point sets;
   determining a skew distance between the pair of point sets by generating a weighted skew distance for the skew distance based on a perpendicularity of the pair of point sets;
   generating an alignment transformation for the first depth sensor and the second depth sensor, the alignment transformation minimizing the weighted skew distance; and
   generating a composite image of the scene based on the alignment transformation.

2. The one or more tangible non-transitory computer-readable storage media of claim 1, wherein a ground uncertainty region is identified in the composite image.

3. The one or more tangible non-transitory computer-readable storage media of claim 2, wherein at least one action of a vehicle is modified based on a location of at least one object being detected relative to the ground uncertainty region.

4. The one or more tangible non-transitory computer-readable storage media of claim 3, wherein the at least one object has a profile that is low relative to a height of the vehicle.

5. The one or more tangible non-transitory computer-readable storage media of claim 2, wherein the ground uncertainty region is generated based on an estimated profile of an object in the scene.

6. The one or more tangible non-transitory computer-readable storage media of claim 5, wherein the object is a road surface.

7. The one or more tangible non-transitory computer-readable storage media of claim 5, wherein the ground uncertainty region is further generated based on a vertical distance corresponding to at least one of noise or an error of known magnitude.

8. One or more tangible non-transitory computer-readable storage media storing computer-executable instructions for performing a computer process on a computing system, the computer process comprising:
   accessing a first distance scan recorded by a first depth sensor, the first depth sensor defining a first field of view;
   accessing a second distance scan recorded by a second depth sensor contemporaneously with the first distance scan, the second depth sensor physically offset from the first depth sensor and defining a second field of view, the second field of view overlapping at least a portion of the first field of view;

determining a pair of point sets, the pair of point sets including a first point set corresponding to a first portion of the first distance scan and a second point set corresponding to a second point set in a second portion of the second distance scan, the first portion of the first distance scan overlapping the second portion of the second distance scan;

determining a skew distance between the pair of point sets;

generating a weighted skew distance for the skew distance based on a magnitude of cross product between the first point set and the second point set; and generating an alignment transformation for the first depth sensor and the second depth sensor, the alignment transformation minimizing the weighted skew distance.

9. The one or more tangible non-transitory computer-readable storage media of claim 8, wherein the first distance scan and the second distance scan are accessed in response to a calibration trigger.

10. The one or more tangible non-transitory computer-readable storage media of claim 9, wherein the calibration trigger is based on a threshold period of time elapsing from a generation of a previous alignment transformation.

11. The one or more tangible non-transitory computer-readable storage media of claim 8, wherein the first point set corresponds to a first line and the second point set corresponds to a second line.

12. The one or more tangible non-transitory computer-readable storage media of claim 11, wherein each of the first line and the second line is formed by:

selecting a point within a row of pixels;

extracting a group of points around the point;

extracting a principal axis of inertia in the group of points; and defining a line extending in a direction parallel to the principal axis of inertia.

13. The one or more tangible non-transitory computer-readable storage media of claim 8, further comprising:

causing a generation of motion planning for navigating along a movement path based on the alignment transformation.

14. One or more tangible non-transitory computer-readable storage media storing computer-executable instructions for performing a computer process on a computing system, the computer process comprising:

accessing a first LIDAR image recorded by a first LIDAR sensor; and accessing a LIDAR image recorded by a second LIDAR sensor physically offset from the first LIDAR sensor;

determining a first set of points in a first region of the first LIDAR image and a second set of points in a second region of the second LIDAR image, the first region overlapping the second region;

determining a pair of point sets from the first set of points and the second set of points, the pair of point sets determined based on a spatial proximity and an initial alignment transformation defining relative positions of the first LIDAR sensor and the second LIDAR sensor;

determining a weight factor based on a perpendicularity of the pair of point sets; and generating an alignment transformation for the first LIDAR image and the second LIDAR image based on the weight factor for the pair of point sets.

15. The one or more tangible non-transitory computer-readable storage media of claim 14, further comprising:

determining a difference between the alignment transformation and a previous alignment transformation.

16. The one or more tangible non-transitory computer-readable storage media of claim 15, wherein a prompt for transitioning from a first mode of operation to a second mode of operation is generated when the difference exceeds a threshold.

17. The one or more tangible non-transitory computer-readable storage media of claim 14, wherein a composite image of the scene is generated based on the alignment transformation.

18. The one or more tangible non-transitory computer-readable storage media of claim 17, wherein a ground uncertainty region is identified in the composite image.

* * * * *